(12) United States Patent
Stratman et al.

(10) Patent No.: US 6,708,979 B2
(45) Date of Patent: Mar. 23, 2004

(54) ORIFICE SEALING PHYSICAL BARRIER

(75) Inventors: Randy Stratman, Waterford, MI (US); Robert B. Davis, Royal Oak, MI (US); Chin Jui Chang, Troy, MI (US); Eric R. Medaris, Berkley, MI (US)

(73) Assignee: Sika Automotive, Madison Heights, MI (US)

(*) Notice: Subject to any disclaimer, the term of this patent is extended or adjusted under 35 U.S.C. 154(b) by 0 days.

(21) Appl. No.: 09/992,365

(22) Filed: Nov. 19, 2001

(65) Prior Publication Data

US 2003/0094771 A1 May 22, 2003

(51) Int. Cl.⁷ .......................... F16J 15/02; B65D 41/00
(52) U.S. Cl. ................. 277/316; 277/630; 277/637; 277/652; 277/931; 220/359.4
(58) Field of Search ................. 277/316, 630, 277/637, 644, 650, 652, 931, 935; 220/359.1, 359.4

(56) References Cited

U.S. PATENT DOCUMENTS

| | | | |
|---|---|---|---|
| 3,760,031 A | 9/1973 | Sato et al. | |
| 3,851,794 A | 12/1974 | Hehl | |
| 4,198,369 A | 4/1980 | Yoshikawa et al. | |
| 4,290,536 A | 9/1981 | Morel | |
| 4,363,420 A | 12/1982 | Andrews | |
| 4,374,687 A * | 2/1983 | Yamamoto | 156/71 |
| 4,391,384 A | 7/1983 | Moore, III et al. | |
| 4,463,870 A | 8/1984 | Coburn, Jr. et al. | |
| 4,494,671 A * | 1/1985 | Moore et al. | 220/257.1 |
| 4,588,104 A | 5/1986 | Danico | |
| 4,588,105 A | 5/1986 | Schmitz et al. | |
| 4,761,319 A * | 8/1988 | Kraus et al. | 428/99 |
| 4,824,726 A * | 4/1989 | Closson, Jr. | 428/349 |
| 5,224,624 A | 7/1993 | Kraus | |
| 5,267,667 A | 12/1993 | Cozzani | |
| 5,483,028 A | 1/1996 | Holwerda | |
| 5,505,324 A | 4/1996 | Danico | |
| 5,558,346 A | 9/1996 | Hartery | |
| 5,577,740 A | 11/1996 | Purdom | |
| 5,702,133 A | 12/1997 | Pavur et al. | |
| 5,731,069 A * | 3/1998 | Delle Donne et al. | 428/215 |
| 5,851,626 A | 12/1998 | McCorry et al. | |
| 5,959,264 A | 9/1999 | Bruck et al. | |
| 6,024,190 A | 2/2000 | Ritzema | |
| 6,319,436 B1 * | 11/2001 | Jaeger et al. | 264/40.6 |
| 6,319,969 B1 * | 11/2001 | Walther et al. | 524/300 |

FOREIGN PATENT DOCUMENTS

| | | |
|---|---|---|
| DE | 2554078A A1 | 6/1977 |
| DE | 19640835A A1 | 4/1998 |
| DE | 19745701A A1 | 4/1999 |
| EP | 0911132 A2 * | 4/1999 |
| FR | 2781496A A1 | 1/2000 |
| GB | 1354973 * | 5/1974 |

OTHER PUBLICATIONS

International Search Report PCT/US02/36308 Filed Mar. 6, 2003 (8 pages).

* cited by examiner

*Primary Examiner*—Alison K. Pickard
(74) *Attorney, Agent, or Firm*—Rader, Fishman & Grauer PLLC

(57) ABSTRACT

The present invention is a physical barrier for an orifice in a panel member which includes a plastic carrier and a patch adapted to adhere to said carrier and the panel member. The present invention also includes a method of sealing an orifice in a metal panel member with a plastic carrier. Lastly, the present invention includes a thermoplastic which adheres to both plastic and metal upon the application of heat.

12 Claims, 5 Drawing Sheets

ORIFICE SEALING PHYSICAL BARRIER

FIELD OF THE INVENTION

This invention relates to devices and methods for sealing orifices in panel members.

BACKGROUND OF THE INVENTION

Physical barriers are commonly used to seal orifices in certain objects, such as panel members in motor vehicles, buildings, household appliances, etc. These barriers normally are used to prevent physical materials, fluids, and gases, such as environmental contaminants, fumes, dirt, dust, moisture, water, etc., from passing through the orifice or cavity. For example, an automotive panel, such as a door panel, typically has several small orifices in the sheet metal, which are created for various reasons during manufacturing. Further, various structural components of automobile bodies have a variety of orifices, hollow posts, cavities, passages and openings that can allow contaminants from the engine and the roadway into the passenger compartment. These holes, orifices, and cavities are typically barricaded with duct tape, butyl-based plastic patches, and sealing plugs made from foam, rubber or some other material. Another known physical barrier for cavities involves introducing a foam product into the cavity, and using a fiberglass matting to fill in the cavity.

One type of known physical barrier is a combination of a metal carrier and a patch of heat flowable material. The metal carrier is inserted into and retained in the orifice to be sealed. Next, the patch is overlaid on the carrier and heated so as to form a seal over the orifice. The metal carrier supports the center of the patch so as to prevent the patch from collapsing into the orifice. This solution is unsatisfactory for a number of reasons. First, the metal carrier is difficult to install into the orifice. Namely, a force multiplying tool and/or a machine is needed to apply a large amount of force to sufficiently flex the retaining means on the metal carrier to allow installation. Second, the metal carrier is heavy while also being relatively expensive to manufacture. The use of other materials for the carrier has previously been limited because patch materials have not been available which adheres to disparate materials. For example, known patches adhere only to metal. Thus, previously both the panel member and the carrier were required to be metal.

Consequently, there is a need for a physical barrier that overcomes one or more of these problems.

SUMMARY OF THE INVENTION

The present invention is a physical barrier for an orifice in a panel member which includes a plastic carrier and a patch adapted to adhere to said carrier and the panel member. The present invention also includes a method of sealing an orifice in a metal panel member with a plastic carrier. Lastly, the present invention includes a thermoplastic material which adheres to both plastic and metal upon the application of heat.

DETAILED DESCRIPTION

Figure 1A:
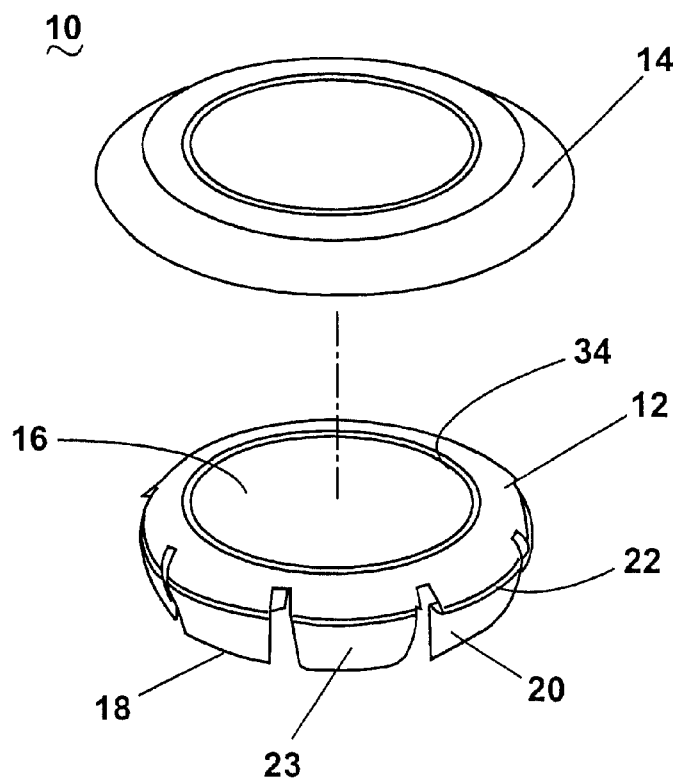
FIG. 1a shows an expanded view of a physical barrier according to the present invention.
Figure 1B:
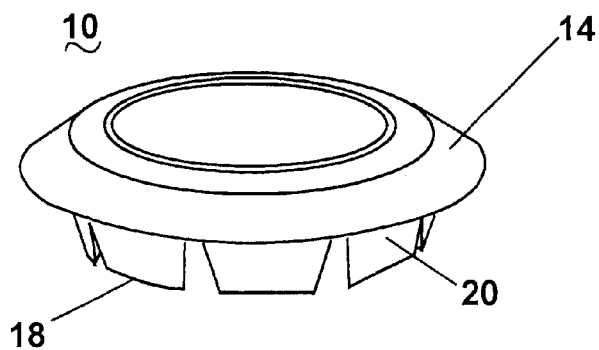
FIG. 1b shows a perspective view of a physical barrier according to the present invention.

The physical barrier 10 of the present invention consists of a plastic carrier 12 and a sealer patch 14 as shown in FIG. 1. Carrier 12 includes a deck 16 and at least one snap-fit fastener 18. Together, carrier 12 and patch 14 form physical barrier 10 for an orifice in a panel member, where deck 16 supports the center of patch 14, such that patch 14 does not collapse into the orifice. Carrier 12 and patch 14 may be shaped and sized to accommodate any orifice in the panel member.

The at least one snap-fit fastener 18 in FIG. 1 is a plurality of protrusions 20 which are generally perpendicular to the plane of deck 16. These protrusions encompass a majority of the perimeter defined by the protrusions. Protrusions 20 include an edge 22 and a holding surface 23.

Figure 2:
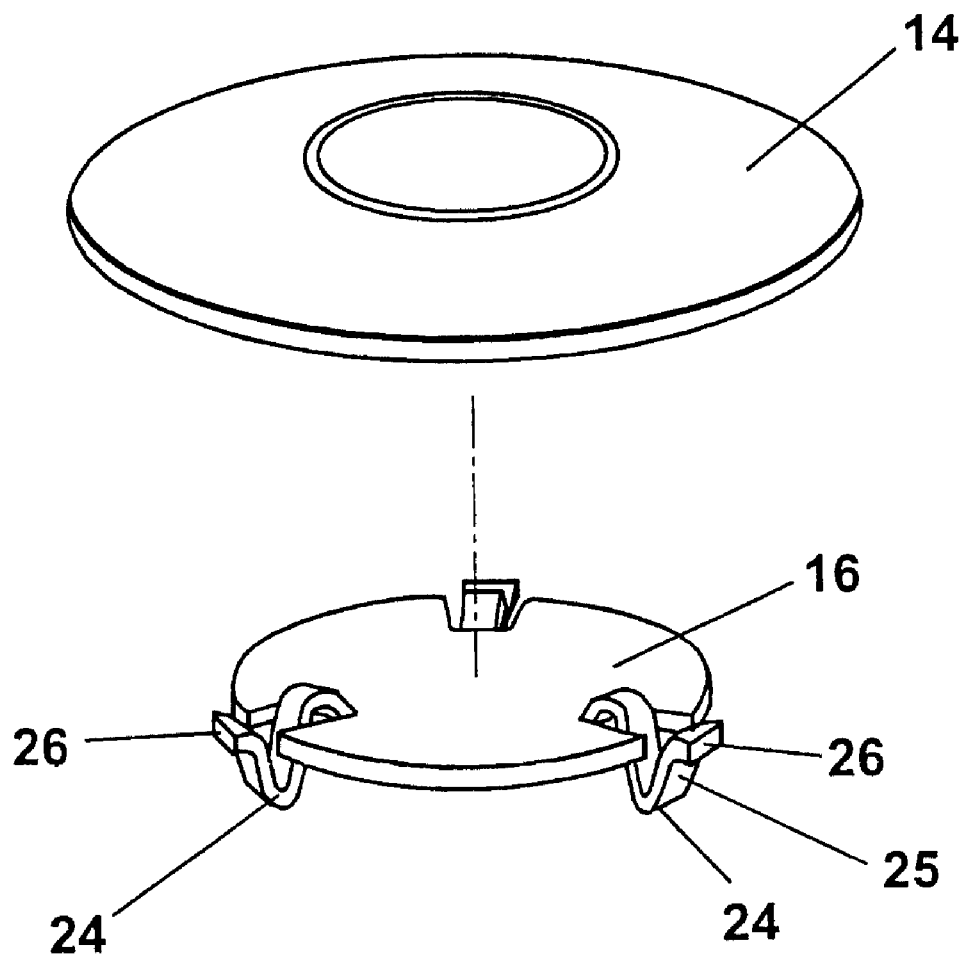
FIG. 2 shows an exploded view of a physical barrier according to the present invention.
Figure 3A:
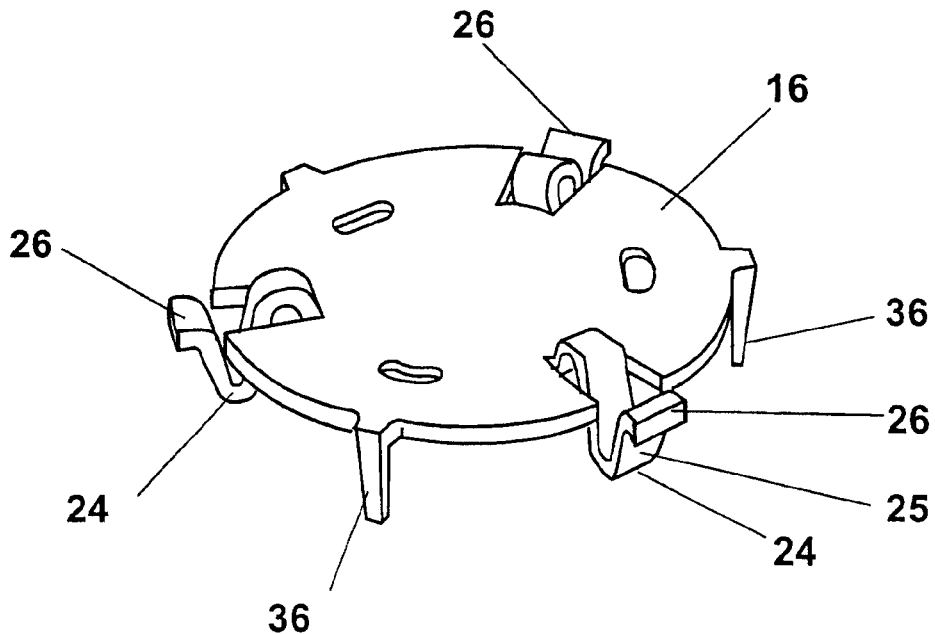
FIG. 3a shows a perspective view of a carrier according to the present invention.
Figure 3B:
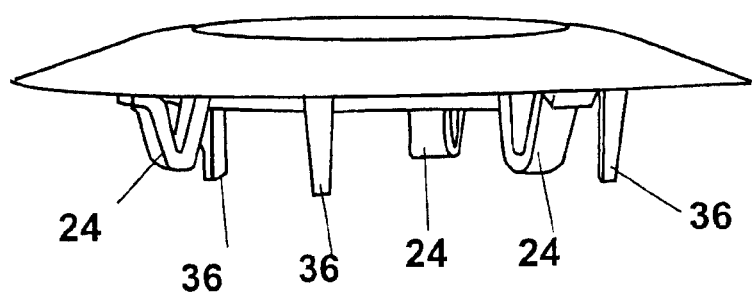
FIG. 3b shows a perspective view of a physical barrier according to the present invention.
Figure 4A:
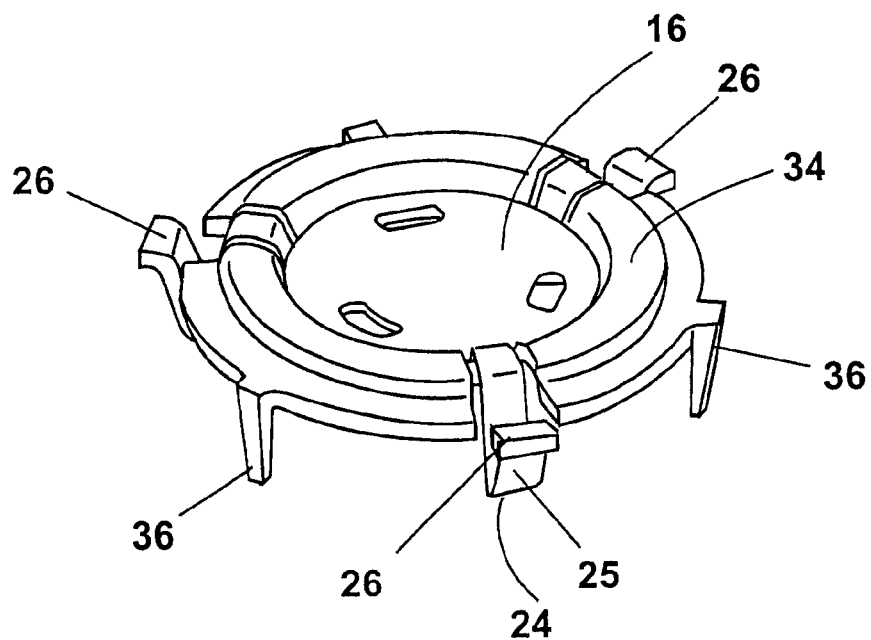
FIG. 4a shows a perspective view of a carrier according to the present invention.
Figure 4B:
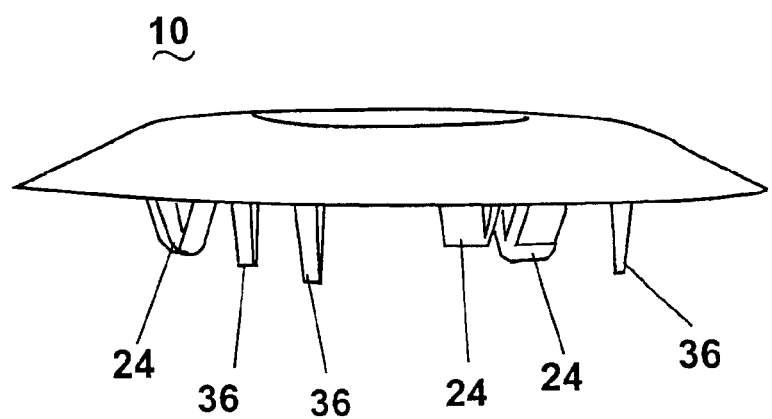
FIG. 4b shows a perspective view of a physical barrier according to the present invention.

The at least one snap-fit fastener 18 in FIGS. 2, 3 and 4 is a plurality of S-shaped clips 24. The long axis of S-shaped clips 24 lies in the place of the carrier deck 16. S-shaped clips 24 include a holding surface 25 and may include a tail 26.

Figure 5A:
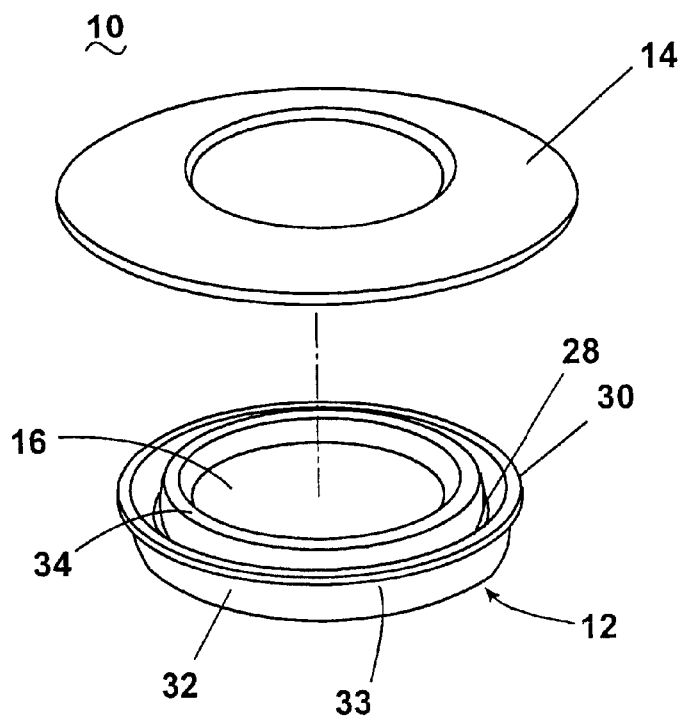
FIG. 5a shows an expanded view of a physical barrier according to the present invention.
Figure 5B:
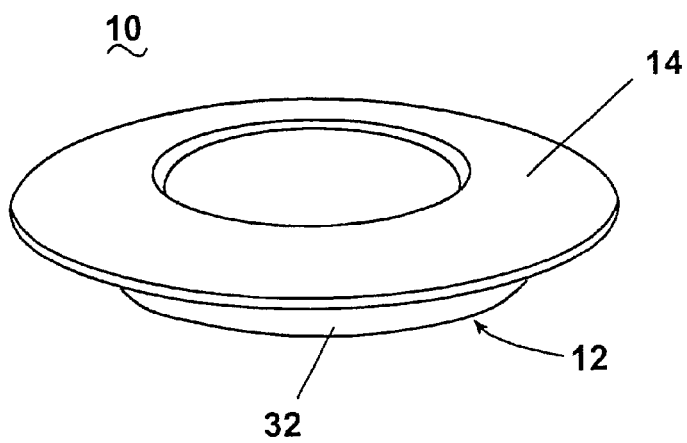
FIG. 5b shows a perspective view of a physical barrier according to the present invention.

The at least one snap-fit fastener 18 in FIG. 5 is a circumferential trough 28 with a lip 30 included on a continuous circumferential outer wall 32 of trough 28. Outer wall 32 also includes a holding surface 33.

Snap-fit fasteners 18 may be any fastener which causes carrier 12 to snap into position, i.e., into the orifice to be sealed. The snap-fit fasteners illustrated in FIGS. 1-5 are not meant to be limiting, but rather only demonstrative.

As shown in FIGS. 1, 4 and 5, deck 16 may include a circumferential ridge 34 which defines a recess into which a protrusion (not shown) on patch 14 may be placed. This helps ensure that the patch is properly place on the carrier. The ridge-protrusion combination also helps to the patch remain in place during insertion of the physical barrier into the orifice.

As shown in FIGS. 3 and 4, carrier 12 may also include multiple legs 36, which are positioned between snap-fit clips 24 and are oriented away from patch 14.

Patch 14 is made of a thermoplastic material that is flowable when activated with heat and that adheres to both plastic and metal. Any thermoplastic which adheres to both metal and plastic is suitable for use in the present invention. Adherence to both metal and plastic is an attribute that has not been previously produced in thermoplastic materials.

In one useful embodiment, patch 14 contains an ethylene-vinyl acetate (EVA) copolymer combined with a styrene butadiene rubber (SBR). One useful EVA is the ELVAX® 400 series from Dupont. A suitable SBR is the 1006 material from Ameripol Synpol Corp of Akron, Ohio.

Patch 14 may also include suitable fillers such talc, mica, tall oil rosin and/or other conventional fillers for thermoplastics. Talc selected for inclusion in patch 14 may be a highly pure platy talc such as one or more chosen from the 9900 series from Polar Minerals of Wellsville, Ohio, while utilized mica may be a phlogopite mica such as one or more chosen from the 5000 series, also from Polar Minerals. A suitable tall oil rosin may be selected from the SYLVAROS series from Arizona Chemical Co. of Jacksonville, Fla.

In one embodiment, EVA is present in amounts of 10–40 wt %, while SBR is present in amounts of 5–35 wt %. The balance includes 5–22 wt % talc, 10–45 wt % mica and 10–30 wt % tall oil rosin. A particularly useful material for patch 14 is a composition of 29 wt % EVA, 16 wt % SBR, 12 wt % talc, 26 wt % mica and 17 wt % tall oil rosin.

Carrier 12 may be made of conventional plastic materials, with the only consideration being the activation temperature for patch 14. Thus, carrier 12 must be able to maintain its physical rigidity at the activation temperature; i.e., carrier 12 should not melt at temperatures used in the chosen heat source. When used in vehicles, the carrier should withstand temperatures normally utilized in the paint and coating drying ovens. While metals may be used, plastics are preferred because of the reduced amount of force needed to install a plastic carrier as compared to a metal carrier. One useful plastic material is nylon.

Physical barrier 10 may be made by conventional methodologies. Carrier 12, separate from patch 14, can be formed, inter alia, by vacuum forming, injection molding or extrusion. Patch 14 may be formed by similar techniques. Once individually formed, carrier 12 and patch 14 may be attached to each other prior to installation into a cavity. An appropriate adhesive may be used, but heat staking is preferred. Heat staking is a process by which two plastic parts are effectively spot welded together.

Methodologies of making carrier 12 and patch 14 parts into one integral piece may also be utilized. Insert molding, which uses two molds, and two shot molding, which uses one mold, are suitable methods of making barrier 10 where carrier 12 and patch 14 are integral.

The installation of barrier 10 is now described. Barrier 10 is inserted into the orifice to be sealed. The snap-fit fasteners flex as carrier 12 is seated in the panel member. Edges 22, tails 26 or lip 30 ensure that carrier 12 is not over inserted into the orifice. Protrusions 20, legs 36 or outer wall 32 ensures that carrier 12 is centered and not twisted in the orifice to be sealed. Holding surfaces 23, 25, 33 are the locations on the respective snap-fit fasteners which abut the panel member after carrier 12 has been installed.

By centering carrier 12, the maximum amount of strain all snap-fit fasteners 18 have to endure is significantly reduced. This reduces the strength of snap-fit fasteners that are needed to properly install barrier 10, which in turn reduces the amount of force needed to install barrier 10. Thus, force-multiplying tools or machines are not needed to install the barriers of the present invention.

After installation, patch 14 is activated to produce a contaminant-tight seal. Patch 14 is activated by heating the patch sufficiently to cause it to flow. Upon cooling, patch 14 will adhere to carrier 12 and the panel member surrounding the orifice. Any source of heat may be used to activate patch 14. One particularly useful heat source is an oven associated with drying coatings and paints on vehicles. These ovens operate at multiple temperatures depending on the coating or paint being dried, and typically operate between about 175° F. and about 400° F.

Plastic carriers with snap-fit fasteners are highly advantageous over known metal carriers because no separate tools or machines are necessary to insert the carrier into a cavity. Metal carriers often require a tool to bend retention tabs at the time of installation. Furthermore, the amount of force required to properly seat the carrier in the orifice is significantly less with a plastic carrier compared to a metal carrier. Plastic carriers may be installed by hand. The reduced amount of required installation force means that less problematic installations. The use of plastic carriers is permitted through the use of a patch which will adhere to disparate materials, i.e., plastic and metal. Such a patch has not previously been available.

While the invention has been specifically described in connection with certain specific embodiments thereof, it is to be understood that this is by way of illustration and not of limitation, and the scope of the appended claims should be construed as broadly as the prior art will permit.

What is claimed is:

1. A physical barrier for an orifice in a panel member, comprising:
   a plastic carrier;
   a patch adapted to adhere to said carrier and the panel member; and
   wherein said patch comprises 10–40 wt % ethylene-vinyl acetate (EVA), 5–35 wt % styrene butadiene rubber (SBR), 5–22 wt % talc, 10–45 wt % mica, and 10–30 wt % tall oil rosin.

2. The physical barrier of claim 1, wherein said carrier is adapted to be attached to said panel member.

3. The physical barrier of claim 2, further comprising one or more snap-fit fasteners mounted on said carrier and adapted to attach said carrier to said panel member.

4. The physical barrier of claim 3, wherein said fasteners are a plurality of S-shaped clips.

5. The physical barrier of claim 4, further comprising a plurality of legs mounted to said carrier and adapted to center said carrier in the orifice.

6. The physical barrier of claim 1, wherein said patch comprises 29 wt % EVA, 16 wt % SBR, 12 wt % talc, 26 wt % mica, and 17 wt % tall oil rosin.

7. The physical barrier of claim 1, wherein
   a said plastic carrier has an inner surface and an outer surface;
   a said patch attached to said outer surface of said carrier and configured to seal an interface between said carrier and the orifice upon being heat-activated.

8. A method of sealing an orifice in a metal panel member, comprising adhering a plastic carrier to the metal panel member with a patch made of a heat activated material, said heat activated material comprising 10–40 wt % ethylene-vinyl acetate (EVA), 5–35 wt % styrene butadiene rubber (SBR), 5–22 wt % talc, 10–45 wt % mica, and 10–30 wt % tall oil rosin.

9. The method of claim 8, prior to the adhering step, including attaching said carrier to the panel member.

10. A thermoplastic material, comprising. 10–40 wt % ethylene-vinyl acetate (EVA) and 5–35 wt % styrene butadiene rubber (SBR), with the balance comprising fillers of talc, mica, and tall oil rosin.

11. The thermoplastic material of claim 10, comprising fillers 5–22 wt % talc, 10–45 wt % mica, and 10–30 wt % tall oil rosin.

12. The thermoplastic material of claim 11, comprising 29 wt % EVA, 16 wt % SBR, 12 wt % talc, 26 wt % mica, and 17 wt % tall oil rosin.

* * * * *

UNITED STATES PATENT AND TRADEMARK OFFICE
CERTIFICATE OF CORRECTION

PATENT NO.     : 6,708,979 B2 Page 1 of 1
DATED          : March 23, 2004
INVENTOR(S)    : Randy Stratman et al.

It is certified that error appears in the above-identified patent and that said Letters Patent is hereby corrected as shown below:

Column 4,
Line 41, please delete "a" before "said plastic"
Line 43, please delete "a" before "said patch"
Line 55, please delete "." after "comprising"

Signed and Sealed this

Twenty-fifth Day of May, 2004

JON W. DUDAS
*Acting Director of the United States Patent and Trademark Office*